Patented May 2, 1933

1,906,462

UNITED STATES PATENT OFFICE

OTTO GROSSKINSKY, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY

PRODUCTION OF CARBON BLACK

No Drawing. Application filed July 19, 1930, Serial No. 469,273, and in Germany July 27, 1929.

The present invention relates to the production of carbon black from carbon monoxide or hydrocarbons or mixtures of the same.

It has already been proposed to prepare a carbon black which is suitable for technical purposes, such as for coloring or for vulcanization of rubber or polymerization products of diolefines by catalytically treating carbon monoxide or hydrocarbons, especially olefines, at elevated temperatures. Among other catalysts, especially iron or nickel or cobalt have been employed for the said process. Also mixed catalysts have been suggested for the preparation of carbon black. The said mixed catalysts were usually prepared by precipitating the dissolved metal salts with substances having an alkaline reaction.

I have now found that the preparation of carbon black from volatilized carbonaceous substances such as carbon monoxide or hydrocarbons especially unsaturated hydrocarbons may be carried out with advantage by effecting the splitting up of the initial materials in the presence of catalysts containing metals of the iron group or oxides of these metals, which catalysts are prepared by heat treatment of a material comprising a solid salt of a metal of the iron group which is not stable to elevated temperatures ranging from about 200° to 600° C. or a mixture of such solid salts with each other or of a solid salt or salts with other compounds, of which mixture at least one constituent comprises a substance containing a metal of the iron group in a free or combined state and of which at least one constituent is a metal salt which is not stable to elevated temperatures. In the mixtures mentioned the constituent comprising a substance containing a metal of the iron group may be at the same time the metal salt which is not stable to elevated temperatures as for example iron nitrate. All these catalytic compositions are hereinafter referred to as substances initially comprising a salt not stable to elevated temperatures and containing a metal of the iron group. According to the present invention decomposable salts of the metals of the iron group are subjected to an elevated temperature effecting the decomposition of the said salts and then to a reducing treatment before they are used as catalysts or they may be employed without further working up as catalysts, in which case the heat treatment and the reduction of the resulting oxides take place during the reaction itself, or the catalysts may be prepared in an analogous manner from mixtures containing any compound of these metals and a salt or a compound which is decomposed at elevated temperatures. As examples of materials suitable for the preparation of catalysts may be mentioned nitrates, nitrites, chlorates, perchlorates or cyanides of the metals of the iron group, that is iron, nickel or cobalt, or compounds of these metals in admixture with nitrates, nitrites, chlorates and like decomposable compounds of the alkali metals, alkaline earth metals, magnesium, zinc, cadmium, thorium, aluminum, gold, copper, silver, zirconium, chromium and other metals. Also cyanates, percarbonates, peroxides, complex cyanides and the like are advantageously employed as salts decomposable at elevated temperatures in the process according to the present invention. Salts which are stable to elevated temperatures, such as silicates, phosphates, tungstates, borates may be present in the catalysts together with the above mentioned salts not stable to temperature. Instead of employing the said salts not stable to elevated temperature for the preparation of the catalysts it is also possible to prepare the latter by preparing mixtures of the metals of the iron group or of the hydroxides of these metals with the free acids yielding the salts not stable to temperature and then subjecting the mixtures obtained to a decomposing treatment for example by heating. The salts not stable to elevated temperatures or mixtures of the same with one another may be present only in small amounts in admixture with other compounds, but also larger amounts of the said substances not stable to elevated temperatures may be present in the catalysts. The catalysts may also consist entirely of substances not stable to elevated temperatures.

The preparation of the catalyst may for example be carried out by washing out a mixture of nickel hydroxide and zinc hydroxide which has been precipitated at room temperature by means of an alkaline agent from an aqueous solution of any salts of the said metals, adding small amounts of sodium nitrite or of potassium nitrate or of the nitrates of sodium or potassium dissolved in water to the paste consisting of the corresponding hydroxides, then forming, pressing and drying the mass obtained and subjecting it after heating in the presence of air to a reducing treatment. In this manner a catalyst is obtained in the presence of which carbon black is obtained from ethylene in excellent yields even at temperatures substantially below 400° C., whereas a catalyst prepared in the same manner but without the addition of sodium nitrite gives almost no carbon black at 400° C. Also mixtures of nitrates with carbonates of the metals of the iron group or those of nitrates with complex cyanides, such as potassium-iron-cyanides and like compounds of any combination may be employed for the preparation of the mixtures from which the catalysts are prepared. The catalysts may also be precipitated on carriers or they may be prepared as powder without forming and pressing. The reduction of the mixture obtained by heating is advantageously carried out before introducing the carbonaceous material to be split up at elevated temperatures. The splitting up may, however, also be carried out in the presence of the catalyst not yet subjected to a reducing treatment; the latter is then reduced during the decomposition of the initial materials yielding carbon black.

Especially suitable as catalysts for the process according to the present invention are those containing cobalt in a free or combined state.

As initial materials for the production of carbon black come into question carbon monoxide and gaseous or vaporized hydrocarbons or gases containing the same, which materials are hereinafter referred to as volatilized combustible carbonaceous substances. Products obtained from chemical processes and also natural products may be employed as initial materials. For splitting up saturated hydrocarbons such as methane, ethane, propane and the like and also benzine and homologues thereof, usually higher temperatures are necessary than for splitting up olefines, diolefines or acetylene which, as it is known, may be split up already at relatively low temperatures. Sometimes the splitting up of the said combustible carbonaceous substances may be more readily effected in the presence of other gases such as carbon dioxide, steam and the like. In this case the deposition of carbon black for example from methane and carbon dioxide occurs according to the equation

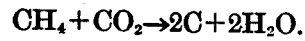

But not only in this special case the addition of indifferent gases is of importance; it is quite generally advantageous to add indifferent gases to the gas to be split up. As additional gases may be mentioned steam, carbon dioxide, nitrogen, hydrogen, small amounts of oxygen and like gases. The said additional gases may be present in molecular as well as in any other proportion.

It is also possible to carry out the process according to the present invention at a decreased or increased pressure. The employment of pressures above atmospheric pressure allows generally of increasing considerably the yield with regard to time and space, though in this case it is necessary to provide for sufficient means for quickly removing the large amount of heat evolved during the reaction. The possibility of employing elevated pressures is chiefly dependent on the way in which the reaction heat is removed.

Generally the carbonaceous gases are split up at temperatures ranging from about 200° to 500° C. In some cases, however, carbon black, which is suitable for special purposes may also be obtained at higher or lower temperatures. Excellent carbon black in good yields with regard to time and space is obtained especially from olefines, diolefines or acetylenes at temperatures of from 300° to 430° C. The hydrogen obtained in addition to the carbon black is usually contaminated with smaller or larger amounts of methane or ethane or the like, which impurities are formed the more readily the lower the reaction temperature is selected.

The preparation of carbon black may be carried out in a discontinuous as well as in a continuous manner.

The following examples will further illustrate the nature of this invention but the invention is not restricted thereto. The parts are by weight.

*Example 1*

An excess of soda, potassium carbonate or ammonium carbonate is added to a solution of a mixture of the nitrates of cobalt, zinc and barium in which the amounts by weight of the metals cobalt, zinc and barium are in the proportion 50:50:1. The precipitate formed is filtered off and washed out. The precipitation may also be effected by an excess of alkali metal hydroxide. The paste obtained is stirred with 0.2 part of potassium nitrite (reckoned on 100 parts of the content of the paste in dry substance) dissolved in water. The mixture is then formed, pressed, dried and filled into a tube having an inner diameter of about 3 centimeters. The tube is then heated in a current of air to a temperature of about 320° C., whereupon the air is removed with nitrogen and the mixture is reduced by means of hydrogen for about 24 hours at a temperature of 330° C. Ethylene is passed over the freshly reduced catalyst at a temperature of 350° to 400° C. so that about 75 liters of ethylene passed through in 3 hours are brought into contact with about 10 grams of the catalyst containing about 50 per cent of cobalt. Carbon black is thus obtained in a yield of about 80 per cent of that required by theory and in addition thereto hydrogen which contains small amounts of methane. The carbon black may satisfactorily be employed for the vulcanization of India rubber or of polymerization products of diolefines such as butadiene.

Carbon black and carbon dioxide is obtained with the same catalyst in a theoretical yield from carbon monoxide under the same reaction conditions but at a temperature of about 400° C. the process is similarly carried out when employing other hydrocarbons or mixtures containing the same.

Example 2

Ammonium carbonate is added to an aqueous solution of a mixture of the nitrates of nickel, cobalt and zinc in which the amounts by weight of the metals nickel, cobalt and zinc are in the proportions 5:92:3. The resulting precipitate containing the corresponding carbonates is then washed out and mixed with 0.5 part of potassium-cobalt-cyanide reckoned on 100 parts of the content of the paste in dry substance. The mixture is then worked up as described in Example 1. A mixture of 1 part by volume of allylene with 1 part by volume of hydrogen is passed over the freshly produced catalyst at a temperature of 350° C. Under conditions similar to those described in Example 1 black active carbon is obtained from the crude carbon black after the removal of the metal particles and after wind sifting. The said active carbon may be advantageously employed for coloring purposes as well as for the vulcanization of rubber and rubber like products. The decomposition of propylene, butylene and butadiene is carried out in the same manner.

Example 3

50 parts of cobalt nitrate, 50 parts of zinc nitrate and 1 part of barium nitrate are finely ground, mixed and heated, while providing for a good stirring of the mixture, for such a long time that no more brown vapors are evolved. The mixture of oxides obtained is then reduced by means of hydrogen at 300° C. When passing ethylene at a temperature of 350° C. over the catalyst thus prepared a very valuable carbon black having a deep color is obtained.

Example 4

60 parts of iron chloride and 40 parts of zinc chloride dissolved in water are precipitated by means of an aqueous solution of potassium ferro cyanide. The precipitate obtained is washed with water until it is free from chlorine and is then treated for 24 hours at a temperature of about 400° C. with a current of hydrogen. The resulting catalyst gives very satisfactory results when employed for the production of carbon black from volatilized carbonaceous substances.

What I claim is:—

1. The process of producing carbon black from volatilized, combustible, carbonaceous substances which comprises contacting said substances with a catalyst obtainable by heating, to high temperatures, a material comprising a salt not stable at said temperatures and a metal of the iron group.

2. The process of producing carbon black from volatilized, combustible, carbonaceous substances which comprises contacting said substances with a catalyst obtainable by heating, to high temperatures, a mixture of solid substances of which at least one comprises a metal of the iron group and of which at least one other is a salt not stable at said temperatures.

3. The process of producing carbon black from volatilized, combustible, carbonaceous substances which comprises contacting said substances with a catalyst obtainable by heating, to high temperatures, a mixture of solid substances of which at least one comprises a metal of the iron group and of which at least one other comprises a salt selected from the group consisting of the nitrites and nitrates of the alkali metals.

4. The process of producing carbon black from volatilized, combustible, carbonaceous substances which comprises contacting said substances with a catalyst obtainable by heating to high temperatures, a mixture of solid substances of which at least one comprises cobalt and of which at least one other is a salt selected from the group consisting of the nitrites and nitrates of alkali metals.

5. The process of producing carbon black from volatilized, combustible, carbonaceous substances which comprises contacting said substances with a catalyst obtainable by heating, to a temperature of 200 to 600° C. a material comprising a salt not stable at said temperatures and a metal of the iron group.

6. The process of producing carbon black from volatilized, combustible, carbonaceous substances which comprises contacting said substances with a catalyst obtainable by heating, to a temperature of from 200 to 600° C., a mixture of solid substances of which at least one comprises a metal of the iron group and of which at least one other comprises a salt not stable at said temperatures.

7. The process of producing carbon black from volatilized, combustible, carbonaceous substances which comprises contacting said substances with a catalyst obtainable by heating, to a temperature of from 200 to 600° C., a mixture of solid substances of which at least one comprises a metal of the iron group and of which at least one other comprises a salt selected from the group consisting of the nitrites and nitrates of the alkali metals.

8. The process of producing carbon black from a gaseous, unsaturated hydrocarbon which comprises contacting said hydrocarbon with a catalyst obtainable by heating, to high temperatures, a mixture of solid substances of which at least one comprises a metal of the iron group and of which at least one other comprises a salt selected from the group consisting of the nitrites and nitrates of the alkali metals.

9. The process of producing carbon black from ethylene which comprises contacting the ethylene with a catalyst obtainable by heating, to high temperatures, a mixture of solid substances of which at least one comprises a metal of the iron group and of which at least one other is a salt selected from the group consisting of the nitrites and nitrates of the alkali metals.

In testimony whereof I have hereunto set my hand.

OTTO GROSSKINSKY.